३,१६४,४३८
PROCESS FOR DYEING POLYPROPYLENE FIBERS WITH AZOIC DYES
Walter W. Thomas, Wilmington, Del., assignor to Hercules Powder Company, Wilmington, Del., a corporation of Delaware
No Drawing. Filed Mar. 29, 1962, Ser. No. 183,382
1 Claim. (Cl. 8—46)

This invention relates to a process for dyeing fibers of stereoregular polypropylene. More particularly, this invention relates to a process for dyeing stereoregular polypropylene fibers with azoic dyestuffs.

It is well known in the art of dyeing that one of the most difficult problems involved in the development of any new fiber is the discovery of satisfactory methods for dyeing the fiber. In fact, it has often been necessary each time a new fiber is introduced to devise entirely new methods, and sometimes even new dyestuffs, for dyeing it.

One of the new fibers that has been introduced recently to the trade is made from stereoregular polypropylene, a highly crystalline polymer that melts in the range of about 165° C. to about 172° C. Stereoregular polypropylene filamentary articles have potentially wide application in textiles, since they possess excellent physical properties, such as, for example, excellent tenacities, superior fatigue and abrasion resistance, and the like. In order for stereoregular polypropylene filamentary articles to enjoy wide-spread use, however, it is necessary that such articles be dyeable in a wide range of colors which are reasonably color fast when subjected to washing and to dry cleaning treatments, and are also reasonably stable to light.

The dyeing of polypropylene fiber, however, has been recognized as an especially difficult problem, even more so than with other known synthetic fiber materials, because of the extremely hydrophobic nature of stereoregular polypropylene and the absence of functional groups in its structure which can serve as "dye sites" to enable dyestuffs to become firmly attached to the fibers. As a consequence, azoic dyeing methods developed for other fiber materials of a hydrophobic nature have proven to be deficient for dyeing stereoregular polypropylene fibers, particularly with respect to resistance to color fading or change when exposed to light.

Accordingly, it is an object of the present invention to provide an improved process for dyeing stereoregular polypropylene fibers with azoic dyestuffs.

Another object of this invention is to provide an improved process for dyeing stereoregular polypropylene filamentary material with azoic dyestuffs whereby dyed material of greatly improved color fastness to light are obtained. Other objects and advantages of this invention will appear from the following description.

These objects and others are accomplished in accordance with this invention which comprises contacting stereoregular polypropylene filamentary material having a polyvalent metal compound uniformly distributed therein with an essentially aqueous composition containing an azoic diazo component in the free amine form and with an essentially aqueous composition containing an azoic coupling component in the free phenol or enol form to effect absorption and penetration into said filamentary material, respectively, of said azoic diazo component and of said azoic coupling component, said azoic diazo component and said azoic coupling component each being characterized by the absence of strongly ionized substituent groups, thereafter contacting the thus treated filamentary material with a diazotizing composition to effect diazotization of the azoic diazo component and coupling of the resulting diazotized component with the azoic coupling component to develop the azoic dye in the filamentary material, and promoting formation of chelate groups between chelatable metal atoms of said polyvalent metal compound and characteristic

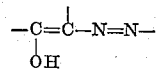

groups present in the azoic dye.

Stereoregular polypropylene fibers dyed with azoic dyestuffs in accordance with this invention are uniformly penetrated throughout by the developed dye, and the dyeings are characterized by excellent levelness of color, excellent color fastness to conventional washing and scouring treatments, and to conventional dry cleaning treatment, and by greatly improved color fastness to light. The dyeings also show excellent resistance to crocking and to gas fading.

In an illustrative embodiment of the invention, for example, stereoregular polyproplene fibers in the form of filaments, staple fiber, threads, yarns, cord, or fabric woven from such fibers, having a polyvalent metal compound uniformly distributed within the body of the fibers, may be scoured in an aqueous scouring bath containing about 1% by weight of an ionic or nonionic scouring agent, based on the weight of the fibers, and adjusted to a pH range of 7 to 9 with tetrasodium pyrophosphate or soda ash. Scouring should be carried out preferably for about 30 minutes at a temperature between about 160° F. and about 180° F. The scoured fibrous material is then well rinsed and kept damp.

A dye component concentrate may be prepared, for example, as follows:

The azoic coupling component, also commonly referred to as the "naphthol" component, in an amount equal to about 0.5% to about 4%, based on fiber weight, is pasted with about 5 to about 5 to about 10 times its weight of denatured ethyl alcohol, or acetone, or methanol, at about 100° F.–110° F. and dissolved by adding about 5 to about 10 parts by weight of a mixture of about 1 part denatured ethyl alcohol, about 1 part water, and about 0.4 part sodium hydroxide, or an equivalent base including organic bases such as ethanolamine which base exhibits a sufficiently high pH value in water to form soluble "naphthol" salts, by weight, warming the solution to about 110° F.–120° F. and finally diluting the mixture with enough distilled, or deionized, water at about 110° F.–120° F. to double the original volume. Complete solution or colloidal dispersion of the azoic coupling component must be obtained, and for convenience this may be designated, "Solution A."

Although a majority of azoic coupling components, as set forth in the above description, required a relatively high pH value, by addition of a base such as sodium hydroxide, to form soluble salts, there are certain azoic coupling components, as for example, some pyrazolones and benzothiazoles, which do not require addition of a base, and formation of a soluble salt, to form suitable solutions upon being pasted with an alcohol or acetone and then diluting with hot water.

A dispersion of the azoic diazo component, also commonly referred to as the "base" component, or as the "diazotizable amine component," may be prepared separately by dispersing an amount of said azoic diazo component which is at least stoichiometrically equivalent to the "naphthol" component, and preferably sufficient to provide at least a small excess of the diazotizable amine in about 10 parts by weight of an aqueous solution containing about 25% by weight of a nonionic emulsifier at about 100° F.–110° F. and diluting with enough distilled, or demineralized, water at about 110° F.–120° F. to double the original volume. This is designated as "Dispersion B."

Although it is generally more economical to prepare an aqueous dispersion of the azoic diazo component, as set forth above, the invention is by no means limited to employment of such a dispersion, since it is entirely feasible to prepare solutions of the azoic diazo component in alcohol, acetone, etc. In fact, it is possible to carry out the whole azoic dyeing operation in a solvent or disperse solvent system in accordance with this invention.

"Solution A" and "Dispersion B" may then be combined and mixed well to produce the dye component concentrate.

The damp scoured stereoregular polypropylene fibrous material is then entered into an aqueous bath at about 150° F. to about 160° F. containing about 1% to about 2% by weight, based on fiber weight, of a nonionic wetting agent, and the bath is adjusted preferably to a pH of 10–12 with an aqueous caustic soda solution, or with an organic base such as ethanolamine. The above-described dye component concentrate is then added to the bath and the temperature of the bath is raised to about 180° F.–200° F. and held at this temperature for about 10 to 60 minutes, while working the fibrous material frequently. After this time the pH of the bath is lowered to pH 6.0–7.0 with aqueous acetic acid of about 50% concentration. While working the fibrous material, the bath is held at 180–200° F. for about 10 to about 60 minutes at this lower pH. The bath is then drained off and the fibrous material is well rinsed with cold water.

The thus treated fibrous material is then immersed at a fiber to liquor ratio of about 1:20 to about 1:40 at room temperature in an aqueous diazotizing bath containing about 4% to about 8% by weight of sodium nitrite, and about 4% to about 8% by weight of 90% formic acid, based on fibrous material weight, and also containing a small amount of nonionic emulsifying agent, and held at room temperature about 20–30 minutes with agitation. The temperature of the diazotizing bath, in which essentially most of the useful coupling has occurred, is then raised to about 110° F. to about 120° F. and then is drained off.

When the coupling is finished, the fibrous material is rinsed first in cold water, then in warm water. This is followed by a hot soaping for about 30 minutes at about 160° F. to about 180° F. at pH 8–10 adjusted with sodium carbonate or tetrasodium pyrophosphate. The soaped fibrous material is then rinsed well with water.

The above illustrative embodiment describes a suitable procedure in accordance with this invention for immersion dyeing of stereoregular polypropylene fibrous material, such as yarn in skein form or loose fabric. The invention, however, is by no means limited to such immersion dyeing of stereoregular polypropylene fibrous material, as set forth above, since the invention is readily adaptable to commercial machinery and techniques for kier, package and rope dyeing, and continuous dyeing by padding or jig procedures. Moreover, although it is convenient and practical to have the azoic coupling component and the azoic diazo component in the presence of each other when impregnating the stereoregular polypropylene fibrous material with these intermediate materials, as set forth above, the invention is not limited in this respect. If desired, the azoic coupling component and the azoic diazo component may be separately applied, from different baths or impregnating compositions, in either order, to the stereoregular polypropylene fibrous material.

However, successful dyeing in accordance with this invention must incorporate all of the following necessary and cooperative features:

(1) The stereoregular polypropylene fibrous material to be dyed should contain, uniformly distributed within the body of the fibers, a polyvalent metal salt or an organic polyvalent metal complex or other polyvalent metallo-organic compound that readily releases its metal atoms so as to let the metal atoms be sequestered, or chelated, with characteristic

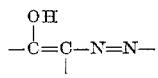

groups in the azoic dyestuff produced, as well as with such characteristic groupings initially present in either the azoic coupling component or the azoic diazo component. It has been found in accordance with this invention that azoic dyeings carried out in the presence of uniformly distributed chelatable metal atoms within the body of the fibers or filaments have greatly superior resistance to color change when exposed to light in comparison to similar azoic dyeings made without such uniformly distributed chelatable metal atoms.

(2) Absorption of azoic coupling component by the stereoregular polypropylene fibrous material requires that the azoic coupling component be in the free phenol or enol form, for stereoregular polypropylene has substantially no absorptive capacity for the phenolate or enolate salt forms of azoic coupling components. Ordinarily, a pH value in the application composition below about 8, and preferably below about 7.5, assures that the azoic coupling component will be in the free phenol or enol form for which stereoregular polypropylene fibers exhibit a strong absorptive affinity.

(3) Azoic diazo components, which typically are primary aromatic amine components, must be absorbed by the stereoregular polypropylene fibrous material as the free amine. This may require pH values in the application bath between about 8 and about 12, but must be sufficiently high to preclude the presence of or formation of amine salts with acids. Stereoregular polypropylene fibers have been found to strongly absorb azoic diazo components in the form of the free amine, but have substantially no absorptive affinity for the salts of such amines with acids.

(4) The azoic coupling component and the azoic diazo component must each be free of highly ionized substituent groups such as sulfonic acid, carboxylic acid, amino-carboxylic acid, halogen-carboxylic acid such as monochloroacetic acid, trichloroacetic acid, and the like, and esters and salts of such acids, for it has been found that stereoregular polypropylene fibers have no absorptive capacity for intermediate azoic dye components containing such groups.

(5) The azoic diazo component must be diazotized in the fiber, since stereoregular polypropylene fibers have substantially no absorptive capacity for the usual prediazotized azoic diazo components. Moreover, it is preferable to carry out the diazotization of the azoic diazo component in the presence of the azoic coupling component to promote optimum coupling and development of the resulting azoic dye within the fiber. If diazotization of the azoic diazo component in the fiber is carried out prior to application of the azoic coupling component to the fiber, decomposition of the diazotized azoic diazo component is likely to occur at the elevated temperatures here recommended for the application of the azoic coupling component before absorption and penetration of the azoic coupling component into the fiber can take place.

The diazotized azoic diazo component preferably should have a high coupling energy at low pH values to promote coupling with the azoic coupling component under the acid conditions of the diazotizing bath, preferably at pH values below 5. The invention is not limited in this respect, however, since in many dyeings satisfactory coupling is promoted in mildly acid conditions at pH values on the order of 6 or even less.

From the foregoing description it will be seen that azoic dyeing of stereoregular polypropylene fibers in accordance with preferred embodiments of this invention involves initial absorption and penetration of the dyestuff intermediates, namely, the azoic diazo component and the azoic coupling component, by polyvalent metal-containing stereoregular polypropylene fibers, followed by exposure of the fibers containing the absorbed dyestuff intermediates in the presence of each other to nitrous acid or nitrous acid yielding compounds, preferably at a pH below 5. In the diazotizing bath the absorbed azoic diazo component diazotizes and the diazotized component couples with the azoic coupling component to form the azoic dye having at least one characteristic

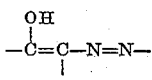

group that can chelate with the chelatable metal atoms present in the stereoregular polypropylene fibers to impart superior resistance to color change upon exposure to light. For example, 3-methyl-1-phenyl-5-pyrazolone,

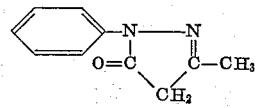

couples with diazotized 4'-amino-2,3'-dimethylazobenzene,

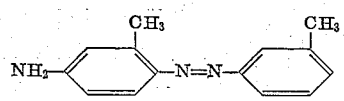

in accordance with this invention to form in situ the azoic dye

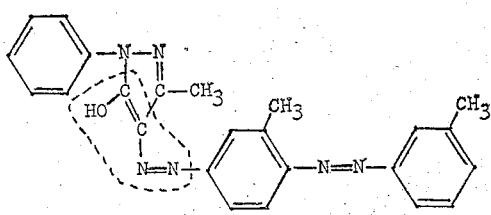

Similarly, 2 - α - acetylacetamido - 6 - ethoxybenzothiazole,

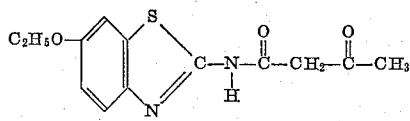

couples with diazotized 5-chloro-o-toluidine,

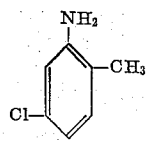

in accordance with this invention to form in situ the azoic dye,

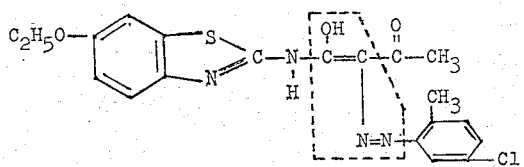

Similarly, 3-hydroxy-2-naphth-6'-ethoxybenzanilide, couples with diazotized 4-benzoylamino-2,5-diethoxyaniline, in accordance with this invention to form in situ the azoic dye, In each of the above three examples, the characteristic group in the developed azoic dye which can chelate with chelatable polyvalent metal atoms present in the stereoregular polypropylene fibers to effect superior color fastness to light of the dyed fibers is enclosed in a dash enclosure for illustrative purposes.

The general nature of the invention having been set forth, the following examples illustrate some specific embodiments of this invention. It is to be understood, however, that the invention is in no way limited to the examples, since this invention may be practiced by the use of various modifications and changes within the scope of the invention as described herein.

*Example 1*

This example illustrates immersion dyeing of fabric knit from 210 denier, 35 filament, stereoregular polypropylene continuous filament yarn having 0.5% by weight, based on fabric weight, of bis(1-[2-hydroxyethyl]-2-undecyl-2-imidazoline) chromium acetate uniformly distributed within the body of the filaments.

This fabric was scoured, prior to dyeing, at a 40 to 1 liquor/fabric ratio by weight in an aqueous bath containing 1% by weight, based on fabric weight, of a nonionic detergent of the alkylphenoxypoly(ethyleneoxy) ethanol type, Igepal CO–630, and adjusted to a pH of 9 with tetrasodium pyrophosphate, for approximately 30 minutes at a temperature of approximately 70° C. The fabric was then well rinsed with distilled water and left under water until subjected to the dyeing procedure.

The dye components were prepared as follows:

Naphthol AS–ITR, C.I. azoic coupling component 12, C.I. 37550, in an amount equal to 1% by weight, based on fabric weight, was pasted with 10 parts by weight, based on Naphthol AS–ITR, of denatured ethyl alcohol and heated to approximately 46° C. with stirring. A solution of sodium hydroxide/water/denatured ethyl alcohol in a ratio of 16/100/100 parts by weight, equal to 10 times the weight of the Naphthol AS–ITR was added to the pasted Naphthol AS–ITR, warming the mixture to approximately 46° C. to dissolve the Naphthol component, and the solution thus obtained was diluted with enough distilled water to double the volume.

A dispersion of the base, Blue BB, C.I. azoic diazo component 20, C.I. 37175, was prepared by pasting an amount of the Blue BB base equal to 1% by weight, based on fabric weight, with 10 parts by weight, based on weight of the Blue BB base, of a 25% by weight solution of Igepal CO–630 in water, and with 5 parts by weight, based on the weight of the Blue BB base, of isopropanol, and heating to approximately 46° C. with stirring. This dispersion of the Blue BB base was then diluted with enough distilled water to double the volume.

The Blue BB base dispersion and the Naphthol AS–ITR solution were then added to a distilled water bath containing 4% by weight, based on fabric weight, of polychlorinated benzene carrier and 1.5% by weight, based on fabric weight, of the trisodium salt of ethylene diamine tetraacetic acid, and the liquor to fabric ratio was adjusted to 40 to 1 by weight with distilled water. The pH of this dye component bath was between 11 and 12. The water-wet fabric was then immersed in the bath, and the bath was raised to boiling in about 30 minutes and boiling was continued for 30 minutes, working the fabric frequently. The pH of the dye component bath was then lowered to a pH value between 6 and 7 using an aqueous acetic acid solution containing approximately 50% by weight of acetic acid. Boiling of the bath was continued for an additional 30 minutes, after which the bath was drained from the fabric, and the fabric was well rinsed with distilled water containing 0.5% by weight of Igepal CO–630, based on fabric weight.

The rinsed fabric from the dye component bath was then immersed at a liquor to fabric ratio of 40 to 1 at room temperature in an aqueous diazotizing and developing bath containing 8% by weight formic acid, 8% by weight sodium nitrite, and 1% by weight of Igepal CO–630, each based on fabric weight, and kept at room temperature for 30 minutes. The temperature of the diazotizing bath was then raised to 50° C. and held at this temperature for an additional 30 minutes. The bath was then drained from the fabric, and the fabric was thoroughly rinsed, first with distilled water at room temperature and then with warm distilled water containing 0.5% by weight of Igepal CO–630, based on fabric weight.

The dyed dabric was then subjected to a hot soaping for 30 minutes at 70° C. at a 40 to 1 liquor to fabric ratio by weight in an aqueous bath containing 1% of Igepal CO–630 and adjusted to a pH of 9 with sodium carbonate. The fabric was then thoroughly rinsed with distilled water, dried and tested.

This fabric was dyed violet and exhibited excellent color fastness as exemplified by color fastness of 5 when subjected to AATCC Dry Cleaning Test Method 85–1960; color fastness of 5 when subjected to AATCC Accelerated Laundering Test Method 61–1957–IIIA; and color fastness of L5 when subjected to AATCC Carbon-Arc Lamp Test Method 16A–1960, described in the Technical Manual of the American Association of Textile Chemists and Colorists, volume XXXVI, 1960, Howes Publishing Co., Inc., 44 East 23rd St., New York City.

*Example 2*

(A) This example illustrates immersion dyeing of a loosely woven stereoregular polypropylene fabric having 28 warp threads and 14 filler threads per inch, and having 0.7% by weight, based on weight of stereoregular polypropylene fiber, of nickel phenol-phenolate of bis(p-tetramethylbutyl phenol) sulfide (containing 6.1% nickel) uniformly distributed within the body of the stereoregular polypropylene fibers.

Substantially the same procedure set forth in Example 1 was followed in this example, the only exceptions being that the azoic diazo component employed in this example was Red FR, C.I. azoic diazo component 33, C.I. 37075, and the azoic coupling component was Naphthol AS–PH, C.I. azoic coupling component 14, C.I. 37558.

The fabric was dyed a scarlet red, and exhibited excellent color fastness as exemplified by color fastness of 5 when subjected to AATCC Dry Cleaning Test Method 85–1960; color fastness of 5 when subjected to AATCC Accelerated Laundering Test Method 61–1957–IIIA; and color fastness of L5 when subjected to AATCC Carbon-Arc Lamp Test Method 16A–1960 corresponding to just appreciable fading after 40 Standard Fading Hours.

(B) When this example was repeated on 4 ply stereoregular polypropylene yarns made from 1½ inch bright staple, having no nickel phenol-phenolate of bis(p-tetramethylbutyl phenol) sulfide distributed within the body of the fibers, there was just appreciable fading after 10 Standard Fading Hours, corresponding to a color fastness of L3 in the AATCC Carbon-Arc Lamp Test Method 16A–1960.

*Example 3*

This example illustrates immersion dyeing of stereoregular polypropylene yarn in skein form, the yarn dyed being 4 ply stereoregular polypropylene yarn made from 1½ inch bright staple, and having 0.7% by weight, based on weight of stereoregular polypropylene fiber, of nickel phenol-phenolate of bis(p-tetramethylbutyl phenol) sulfide (containing 6.1% nickel) uniformly distributed within the body of the fibers.

Substantially the same procedure set forth in Example 1 was followed in this example, the only exceptions being that the azoic diazo component employed in this example was Garnet GC, C.I. azoic diazo component 27, C.I. 37215, and the azoic coupling component was Developer Z, C.I. Developer 1.

The yarn was dyed a bright yellow, and exhibited excellent color fastness as exemplified by color fastness of 5 when subjected to AATCC Dry Cleaning Test Method 85–1960; color fastness of 5 when subjected to AATCC Accelerated Laundering Test Method 61–1957–IIIA; and color fastness of L5 when subjected to AATCC Carbon-Arc Lamp Test Method 16A–1960.

*Example 4*

Samples of the same loosely woven stereoregular polypropylene fabric employed in Example 2(A) were dyed with various combinations of azoic coupling components (Naphthols) and azoic diazo components (Bases), employing substantially the same procedure set forth in Example 1 in all dyeings. The following table sets forth the pertinent data with respect to the azoic coupling components and azoic diazo components employed, the color obtained in each dyeing and color fastness data obtained in the AATCC dry cleaning, laundering and light exposure tests.

| Naphthol | | | Base | | | AATCC Color Fastness Tests | | | |
|---|---|---|---|---|---|---|---|---|---|
| | Colour Index Designation | | | Colour Index Designation | | | Dry Cleaning Test Method 85-1960 Rating [1] | Accelerated Laundering Test Method 61-1957-IIIA Rating [2] | Carbon-Arc Lamp Test Method 16A-1960 Rating [3] |
| Common Designation | C.I. Azoic Coupling Component Number | Colour Index Number | Common Designation | C.I. Azoic Diazo Component Number | Colour Index Number | Color of Dyeing | | | |
| Developer Z | C.I. Developer 1. | | Garnet GC | 27 | 37215 | Yellow | 5 | 5 | L5. |
| AS-OL | 20 | 37530 | Orange GC | 2 | 37005 | Orange | 5 | 5 | L4. |
| AS-OL | 20 | 37530 | Red KB | 32 | 37090 | Scarlet | 5 | 5 | L4. |
| AS-OL | 20 | 37530 | Scarlet R | 13 | 37130 | Rose, Pink | 5 | 5 | L4. |
| AS-OL | 20 | 37530 | Blue B | 48 | 37235 | Violet, Lavender | 5 | 5 | L4. |
| AS-BI | 45 | 37566 | Red TR | 11 | 37085 | Orange | 5 | 5 | L4. |
| AS-BI | 45 | 37566 | Scarlet GC | 12 | 37105 | Scarlet | 5 | 5 | L5. |
| AS-BI | 45 | 37566 | Scarlet 2G | 3 | 37010 | ---do--- | 5 | 5 | L4. |
| AS-BI | 45 | 37566 | Scarlet TR | 46 | 37080 | ---do--- | 5 | 5 | L5. |
| AS-BI | 45 | 37566 | Red RL | 34 | 37100 | ---do--- | 5 | 5 | L4. |
| AS-BI | 45 | 37566 | Red KB | 32 | 37090 | ---do--- | 5 | 5 | L5. |
| AS-BI | 45 | 37566 | Red RC | 10 | 37120 | Rose, Pink | 5 | 5 | L5. |
| AS-BI | 45 | 37566 | Red FR | 33 | 37075 | Red, Rubine | 5 | 5 | L5. |
| AS-BI | 45 | 37566 | Red FG | 26 | 37070 | Bordeaux | 5 | 5 | L4. |
| AS-BI | 45 | 37566 | Red 2G | 37 | 37035 | ---do--- | 5 | 5 | L4. |
| AS-BI | 45 | 37566 | Scarlet R | 13 | 37130 | ---do--- | 5 | 5 | L5. |
| AS-BI | 45 | 37566 | Blue B | 48 | 37235 | Violet, Lavender | 5 | 5 | L4. |
| AS-BI | 45 | 37566 | Blue BB | 20 | 37175 | Purple, Corinth | 5 | 5 | L4. |
| AS-BI | 45 | 37566 | Garnet GBC | 4 | 37210 | Garnet | 5 | 5 | L4. |
| AS-BI | 45 | 37566 | Garnet GC | 27 | 37215 | ---do--- | 5 | 5 | L5. |
| AS-PH | 14 | 37558 | Scarlet G | 12 | 37105 | Orange | 5 | 5 | L5. |
| AS-PH | 14 | 37558 | Scarlet 2G | 3 | 37010 | ---do--- | 5 | 5 | L5. |
| AS-PH | 14 | 37558 | Scarlet R | 13 | 37130 | ---do--- | 5 | 5 | L5. |
| AS-PH | 14 | 37558 | Red KB | 32 | 37090 | Scarlet | 5 | 5 | L4. |
| AS-PH | 14 | 37558 | Red RL | 34 | 37100 | ---do--- | 5 | 5 | L4. |
| AS-PH | 14 | 37558 | Scarlet TR | 46 | 37080 | ---do--- | 5 | 5 | L5. |
| AS-PH | 14 | 37558 | Red RC | 10 | 37120 | Rose, Pink | 5 | 5 | L5. |
| AS-PH | 14 | 37558 | Scarlet RC | 13 | 37130 | Red, Rubine | 5 | 5 | L4. |
| AS-PH | 14 | 37558 | Red FR | 33 | 37075 | Red | 5 | 5 | L5. |
| AS-PH | 14 | 37558 | Red TR | 11 | 37085 | Magenta | 5 | 5 | L4. |
| AS-PH | 14 | 37558 | Corinth LB | 43 | 37160 | Violet, Lavender | 5 | 5 | L5. |
| AS-PH | 14 | 37558 | Blue BB | 20 | 37175 | Purple, Corinth | 5 | 5 | L4. |
| AS-PH | 14 | 37558 | Garnet GBC | 4 | 37210 | Garnet | 5 | 5 | L5. |
| AS-PH | 14 | 37558 | Garnet GC | 27 | 37215 | ---do--- | 5 | 5 | L5. |
| AS-PH | 14 | 37558 | Blue B | 48 | 37235 | Blue | 5 | 5 | L4. |
| AS-ITR | 12 | 37550 | Scarlet R | 13 | 37130 | Scarlet | 5 | 5 | L4. |
| AS-ITR | 12 | 37550 | Red ITR | 42 | 37150 | Rose, Pink | 5 | 5 | L5. |
| AS-ITR | 12 | 37550 | Blue BB | 20 | 37175 | Purple, Corinth | 5 | 5 | L5. |
| AS-4LG | 9 | 37625 | Red KB | 32 | 37090 | Yellow | 5 | 5 | L5. |

[1] 1=Poor ... 5=Excellent.
[2] 1=Poor ... 5=Excellent.
[3] L1=Just appreciable fading after 2.5 Standard Fading Hours.
L2=Just appreciable fading after 5 Standard Fading Hours.
L3=Just appreciable fading after 10 Standard Fading Hours.
L4=Just appreciable fading after 20 Standard Fading Hours.
L5=Just appreciable fading after 40 Standard Fading Hours.

*Example 5*

This example illustrates package dyeing of bulk stereoregular polypropylene staple fiber in a Smith Drum Package Dyeing Machine. The staple fiber employed was 15 denier stereoregular polypropylene 1½ inch bright staple having 0.7% by weight, based on weight of stereoregular polypropylene fiber, of nickel phenol-phenolate of bis(p-tetramethylbutyl phenol) sulfide (containing 6.1% nickel) uniformly distributed within the body of the fibers.

This staple fiber was subjected to a predyeing scour and rinsing substantially as set forth in Example 1, and the moist scoured fibers were packed firmly in the basket of the dyeing machine, which held 1½ pounds, dry basis, of the staple fiber. Approximately 11 gallons of distilled water containing 1% by weight of Igepal CO-630, 1.5% by weight of the trisodium salt of ethylene diamine tetraacetic acid, and 4% by weight of polychlorinated benzene carrier, each based on weight of the staple fiber, and enough 10% sodium hydroxide to bring the pH of the liquor to approximately a value of 11, was circulated through the staple fiber at 60° C. for approximately 30 minutes, whereupon the dye components, Naphthol AS-BI, C.I. azoic coupling component 45, C.I. 37566, and Garnet GBC, C.I. azoic diazo component 4, C.I. 37210, prepared by the same procedure described in Example 1 and with similar quantities of ingredients, based on staple fiber weight, were introduced into the circulating liquor bath. The liquor, having a pH between 11-12, was heated to 100° C. and circulation through the packed staple fiber was continued for 30 minutes. The pH of the circulating liquor was then adjusted to a pH between 6 and 7 with aqueous acetic acid containing approximately 50% by weight of acetic acid, and the liquor was circulated through the packed staple fibers for an additional 30 minutes at 100° C. The dye component liquor bath was then drained from the machine, and the staple fiber was thoroughly washed and rinsed by circulating distilled water containing 0.5% by weight of Igepal CO-630, based on staple fiber weight, through the staple fiber.

The rinse water was drained from the machine, and was replaced by approximately 11 gallons of an aqueous diazotizing and developing liquor containing 8% by weight of formic acid, 8% by weight of sodium nitrite, and 1% by weight of Igepal CO-630, each based on staple fiber weight, which was circulated through the staple fiber at room temperature for 30 minutes, and then heated to 50° C. and circulated through the staple fiber for 30 more minutes. The diazotizing liquor was then drained from the machine, and the staple fiber was thoroughly rinsed, first with distilled water at room temperature, and then with warm distilled water containing 0.5% Igepal CO-630, based on staple fiber weight, by circulation of the rinsing waters through the staple fiber, and draining.

The staple fiber was then removed from the package dyeing machine and subjected to a post-dyeing hot soaping, rinsing and drying, substantially as described in Example 1.

The staple fiber was dyed to a deep shade of brown, and exhibited excellent color fastness as exemplified by color fastness of 5 when subjected to AATCC Dry Cleaning Test Method 85-1960; color fastness of 5 when subjected to AATCC Accelerated Laundering Test Method 61-1957-IIIA; and color fastness of L5 when subjected to AATCC Carbon-Arc Lamp Test Method 16A–1960.

It has been previously pointed out that stereoregular polypropylene fibers to be dyed in accordance with this invention should contain, uniformly distributed in the body of the fiber, a polyvalent metal compound that readily releases its metal atoms for chelation, or sequestering, with characteristic

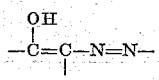

groups in the azoic dyestuff. This is essential in order to develop dyeings which are color fast to light. In order to assure the presence of chelatable metal atoms uniformly distributed within the body of the fibers at the time the fibers are dyed, the polyvalent metal compound can be introduced into the polypropylene at any convenient point in the manufacture thereof prior to spinning the fibers. For example, the polyvalent metal compound can be added to the polymerization reaction mixture, or can be incorporated into manufactured stereoregular polypropylene flake or granules by malaxating the polypropylene with the polyvalent metal compound on a hot two roll mill, or in a Banbury mixer, or in the barrel of a heated extruding apparatus, including the hot melt extruding apparatus for spinning the fibers.

Any polyvalent metal compound that releases its metal atoms for chelation with characteristic

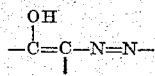

groups in the azoic dye is suitable for the purposes of this invention. Accordingly, suitable polyvalent metal compounds may be inorganic or organic in nature, as for example, inorganic salts, organic salts, or organo-metallic compounds. Typical polyvalent metal compounds include, by way of example, compounds of copper, zinc, calcium, magnesium, strontium, barium, cadmium, aluminum, titanium, tin, lead, vanadium, antimony, bismuth, chromium, molybdenum, manganese, iron, cobalt, nickel, and the like; such as the halides, nitrates, sulfates, carbonates, bicarbonates, phosphates, stannates, chromates, dichromates, and the like; salts of organic acids such as the formates, acetates, butyrates, octanoates, laurates, oleates, stearates, benzoates, phthalates, oxalates, tartrates, citrates, malonates, maleates, sebacates, and the like; and organo-metallic compounds such as nickel-, cobalt-, iron-, manganese-carbonyls; alkylaluminum, alkylmagnesium, alkylzinc, alkyllead; nickel and chromium phenolphenolates; chelates of nickel, chromium, cobalt, aluminum, zinc, and the like, with acetylacetone, trifluoroacetylacetone, acetonylacetone, benzoylacetone, furoylacetone, dibenzoylmethane, acetoacetic acid, ethyl acetoacetate, formylacetone, hydroxyethyl methyl acetone, hydroxyacetone, o-hydroxyacetophenone, 2,5-dihydroxy-p-benzophenone, salicylaldehyde, ethyl glycolate, 2-hydroxyethyl acetate, monoesters of oxalic acid, mono- and diesters of malonic acid, malonaldehyde, ethoxyacetic acid, 2,3-butanedione-monoxime, glyoxal monoxime, N-phenyl benzohydroxamic acid, dimethyl glyoxime, 1,3-nitroalcohols, 1,3-nitroketones, 2-nitroacetic acid, 1,2-nitroso-oximes, and the like; and any desired mixture of any of the above polyvalent metal compounds. In general, organic salts of polyvalent metals and organo-metallic compounds are preferred, since these compounds are more compatible with the stereoregular polypropylene and release their metal atoms for chelation with the azoic dye molecules more readily.

The chelated polyvalent metal-azoic dye molecule complexes formed in accordance with this invention may be complexes in which one metal atom is chelated with one azoic dye molecule, or complexes in which one metal atom is chelated with two azoic dye molecules, or may be a mixture of both types. It follows, therefore, that for optimum results, the amount of polyvalent metal compound employed should be sufficient to supply at least one chelatable metal atom for each azoic dye molecule. However, the amount of chelatable polyvalent metal atoms, based on fiber weight, may vary from minute amounts, less than 0.1%, to amounts on the order of 5% or more. For many dyeings, it has been found that stereoregular polypropylene fiber containing only very small amounts of polyvalent metal residues derived from polymerization catalyst and catalyst neutralization is sufficient to form insoluble stable complexes with the azoic dye molecules, and thereby produce substantially permanent colors resistant to fading or change when exposed to light, and also resistant to washing, scouring and dry cleaning treatments. Additionally, it has been found that polyvalent metal atoms such as nickel or chromium in organo-metallic compounds which are added to stereoregular polypropylene fibers to stabilize the fibers against the degrading effect of light also can form insoluble stable complexes with the azoic dye molecules. In this latter case, sufficient polyvalent metal compound should be used to provide for both stabilization of the fibers and formation of insoluble stable complexes with the azoic dye molecules.

Azoic coupling components in accordance with this invention are organic compounds which can couple with a diazotized amine to produce an azoic dye and which do not contain highly ionizable substituent groups such as sulfonic acid, carboxylic acid, amino-carboxylic acid, halogen-carboxylic acid such as monochloroacetic acid, trichloroacetic acid, and the like, or esters or salts of such acids. They may be phenolic in character, or may be enolizable compounds which can couple with a diazotized amine. In either case the azoic coupling component has the characteristic grouping

which couples with the diazotized amine.

Suitable azoic coupling components of phenolic character are polynuclear aromatic compounds and include by way of example, α- and β-naphthols and their derivatives, such as the nitro-, alkyl-, alkoxy-, hydroxyalkyl-, hydroxy-, fluoro-, chloro-, bromo-, indonaphthols, the naphthocetols, and the like; derivatives of oxynaphthoic acid, and especially the arylides of 3-oxynaphthoic acid having the general formula

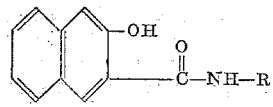

in which R denotes the substituted aryl radical; and include, for example, 4'-chloro-3-hydroxy-2-naphthanilide, 3'-chloro-3-hydroxy-2-naphthanilide, 3-hydroxy-3'-nitro-2-naphthanilide, 3-hydroxy-4'-nitro-2-naphthanilide, 3-hydroxy-2-naphtho-o-toluidide, 3-hydroxy-2-naphtho-p-toluidide, 4'-chloro-3-hydroxy-2-naphtho-o-toluidide, 5'-chloro-3-hydroxy-2-naphtho-o-toluidide, 3-hydroxy-2-naphtho-2,4-xylidide, 3-hydroxy-2-naphth-o-anisidide, 5'-chloro-3-hydroxy-2-naphth-o-anisidide, 5'-bromo-3-hydroxy-2-naphth-o-anisidide, 3-hydroxy-2-naphth-p-anisidide, 3-hydroxy-2'-methyl-2-naphth-p-anisidide, 3-hydroxy-2',5'-dimethoxy-2-naphthanilide, 5'-chloro-3-hydroxy-2',4'-dimethoxy-2-naphthanilide, 4'-chloro-3-hydroxy-2',5'-dimethoxy-2-naphthanilide, 3-hydroxy-2-naphtho-o-phenetidide, 3-hydroxy-2-naphtho-p-phenetidide, 3-hydroxy-N-1-naphthyl-2-naphthamide, 3-hydroxy-N-2-naphthyl-2-naphthamide, 7-bromo-3-hydroxy-2-naphth-o-anisidide, and the like; other derivatives of oxynaphthoic acid having the general formula

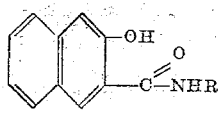

in which R is of a more complex nature; and include, for example, 3,3″ - dihydroxy-4′,4‴-bi-2-naphtho-o-toluidide, 3,3″ - dihydroxy - 4′,4‴ - bi-2-naphtho-o-anisidide, 3-hydroxy-N-(2-methoxy-3-dibenzofuryl)-2-naphthamide, and the like; the arylides of anthracene oxycarboxylic acids, and of oxycarbazole carboxylic acid having the respective following general formulas:

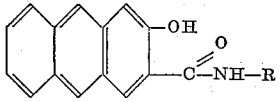

and

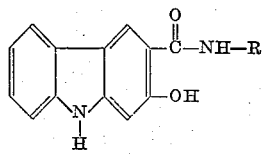

in which R in each general formula above denotes the substituted aryl radical, and in which R in each general formula above has the same significance as the R substituent in the arylides of 3-oxynaphthoic acid set forth hereinbefore; and include, for example, 3-hydroxy-2-o-anthrotoluidide, 4′ - chloro-2-hydroxy-3-carbazolecarboxanilide, 3′ - hydroxy-benzocarbazole-2′-carbox-p-anisidide, 2 - hydroxy-2′,5′ - dimethoxy-3-dibenzofurancarboxanilide; and various monohydroxyanthraquinones, dihydroxyanthraquinones, and substituted monohydroxy- and dihydroxyanthraquinones, such as 1-hydroxyanthraquinone, 2-hydroxyanthraquinone, 1,2-dihydroxyanthraquinone, 2,3-dihydroxyanthraquinone, 1,3-dihydroxyanthraquinone, 1,4-dihydroxyanthraquinone, 1,5 - dihydroxyanthraquinone, 1,6-dihydroxyanthraquinone, 1,7-dihydroxyanthraquinone, 1,8-dihydroxyanthraquinone, 2,5-dihydroxyanthraquinone, 2,6-dihydroxyanthraquinone, 2,7-dihydroxyanthraquinone, and various substituted derivatives of any of these dihydroxy- and hydroxyanthraquinones in which the substituent group or groups may be nitro-, fluoro-, chloro-, bromo-, iodo-, alkyl-, alkoxy-, hydroxyalkyl-, and the like; in any position in the molecule which does not block or inhibit coupling of a diazotized amine with a characteristic

grouping in the azoic coupling component molecule.

Suitable azoic coupling components which are enolizable compounds which can couple with a diazotized amine to produce an azoic dye include, by way of example, variously substituted pyrazolones, such as for example, phenyl methyl pyrazolones such as 3-methyl-1-phenyl-5-pyrazolone and variously phenyl-substituted methyl prazolones, particularly the nitrophenyl methyl pyrazolones and chlorophenyl methyl pyrazolones, also 1,3 - diphenyl - 5-pyrazolone, and the various nitrochlorophenyl methyl pyrazolones, and the like; various acylacetamido derivatives, such as 4,4′ - bi - o - acetoacetotoluidide, $\alpha,\alpha'$ - terephthaloylbis(5-chloro - 2,4 - dimethoxyacetanilide), $\alpha,\alpha'$-terephthaloylbis(4-chloro-5-methyl-o-acetanisidide), 4′-$\alpha$-benzolylacetamido - 2′,5 - dimethoxybenzanilide, 2-$\alpha$-acetylacetamido - 6 - ethoxybenzonthiazole, and similar acylacetamido derivatives with thiazoles, carbazothiazoles, aminonaphthothiazoles and the like.

The above azoic coupling components are well know in the dyeing art, and are available from various dyestuff manufacturers. Colour Index, second edition, 1956, edited jointly by The Society of Dyers and Colourists and The American Association of Textile Chemists and Colorists compiles a vast amount of information on these materials relative to commercial names, manufacturers, chemical composition and how made, identification by C.I. numbers and names, and the like. With the exception of phenyl methyl pyrazolone and derivatives of the hydroxyanthraquinones, important information on the other types of azoic coupling components is compiled on pages 2613–2628, vol. 2, and on pages 3326–3333, vol. 3 of the Colour Index. Pertinent information on phenyl methyl pyrazolone, identified in the Colour Index as C. I. Developer 1, appears on page 2925, vol. 2 of the Colour Index. Pertinent information on the various derivatives of hydroxyanthraquinones suitable for the purposes of this invention will be found among the anthraquinone derivatives listed on pages 3471–3476, 3492, and 3507–3508, vol. 3 of the Colour Index, and some of which are specifically identified as follows:

| Page No. | Colour Index Number | Colour Index Name Designation |
|---|---|---|
| 3471 | 58000 | C.I. Mordant Red 11. |
| 3472 | 58020 | C.I. Mordant Brown 44. |
| 3475 | 58230 | C.I. Mordant Red 45. |
| 3476 | 58240 | C.I. Mordant Red 4. |
| 3476 | 58255 | C.I. Mordant Red 2. |
| 3492 | 60740 | Disperse Dye. |
| 3492 | 60745 | C.I. Pigment Red 89. |
| 3507 | 62545 | Solvent Dye. |
| 3508 | 62580 | Disperse Dye. |

Preferred azoic coupling components for the purpose of this invention include 3-methyl-1-phenyl - 5 - pyrazolone (C.I. Developer 1), 2-$\alpha$-acetylacetamido-6-ethoxybenzothiazole (C.I. azoic coupling component 9, C.I. 37625), 5′-chloro-3-hydroxy - 2′,4′ - dimethoxy - 2 - naphthanilide (C.I. azoic coupling component 12, C.I. 37550), 3-hydroxy-2-naphtho-o-phenetidide (C.I. azoic coupling component 14, C.I. 37558), 3-hydroxy-2- naphtho-o-anisidide (C.I. azoic coupling component 20, C.I. 37530), 7-bromo-3 - hydroxy - 2 - naphtho-o-anisidide (C.I. azoic coupling component 45, C.I. 37566), and 4′-chloro-2-hydroxy-3-carbazole-carboxanilide (C.I. azoic coupling component 15, C.I. 37600).

As noted hereinbefore, the azoic coupling component must be free of highly ionizable substituent groups such as sulfonic acid, carboxylic acid, amino-carboxylic acid, halogen-carboxylic acid such as monochloroacetic acid, trichloroacetic acid, and the like, and esters or salts of such acids. This is essential for successful practice of this invention, and it will be noted that all of the above enumerated azoic coupling components meet this essential requirement. Moreover, the azoic coupling component should be in the free phenol or enol form for effective and uniform absorption of the azoic coupling component into the body of the stereoregular polypropylene fibers. Stated differently, the azoic coupling component should have a free hydroxyl in the characteristic coupling group thereof for effective and uniform absorption into the body of the stereoregular polypropylene fibers. Ordinarily, a pH value below about 8, and preferably below about 7.5 in the application composition containing the azoic coupling component will assure that the azoic coupling component is in the free phenol or enol state. At pH values above about 8 there is a pronounced tendency for the formation of phenolate and enolate salts for which stereoregular polypropylene fibers have substantially no absorptive affinity. Absorption is favored and accelerated by employing elevated temperatures up to the boiling point of the application composition containing the azoic coupling component, preferably between about 180° F. and 200° F. Lower temperatures can be employed, but the rate of absorption is greatly reduced.

The amount of azoic coupling component employed can range between about 0.25% and about 4% by weight, based on fiber weight, and preferably between about 0.5% and about 1%. Amounts less than 0.25% by weight usually lead to weak color values. Usually absorption of the azoic coupling component by the fibers requires only a short time, on the order of about 15 minutes to about 30 minutes at a temperature between about 180° F. to about 200° F., but longer cycles may be employed as may be desired or necessary in commercial operations.

Practice of this invention contemplates the use in the azoic coupling component composition of various conventional dye bath assistants and auxiliaries, such as emulsifying agents, wetting agents, carriers, swelling agents such as polychlorinated benzene derivatives, glycols, glycol ethers such as the monomethyl ether of ethylene glycol, thiodiglycol, thiodiglycol ethers, etc., developers, protective colloids, stabilizers, and the like, in amounts commonly employed in azoic dyeing of hydrophobic fibers. Surface active agents, preferably nonionic types, such as alkylaryl polyether alcohols or polyoxyalkylated alkylphenols, and developers such as diethyltartrate or diethylethanolamine are particularly desirable in preferred practice of this invention. Other suitable and desirable surface active agents include alkylaryl sulfonates such as higher alkyl benzene sulfonates, sulfonated condensation products of naphthalene and formaldehyde, isopropyl and isobutyl naphthalene sulfonates, sulfonated fatty acids, higher alkyl esters of sulfosuccinic acid, alicyclic sulfonates such as N-oleyl-N-methyl-taurine, sulfonated rosin or its derivatives, lignin sulfonates, and the like.

Any diazotizable aromatic primary amine or substituted aromatic primary amine which is free of highly ionizable substituent groups such as sulfonic acid, carboxylic acid, amino-carboxylic acid, halogen-carboxylic acid, and the like, and esters or salts of such acids, is suitable as the azoic diazo component for the purposes of this invention. Vast numbers of such aromatic primary amines and substituted aromatic primary amines are well known in the dyeing art, and are readily available from various dyestuff manufacturers, either as the free amine base, or as an acid salt thereof, such as the hydrochloride salts. Important information on these materials is compiled on pages 2571–2612, vol. 2, and on pages 3317–3326, vol. 3 of the Colour Index, cited hereinabove in describing azoic coupling components.

Preferred azoic diazo components for the purposes of this invention include by way of example:

| Azoic Diazo Component Number | Colour Index Number | Chemical Composition |
| --- | --- | --- |
| 2 | 37005 | m-chloroaniline. |
| 3 | 37010 | 2,5-dichloroaniline. |
| 4 | 37210 | 4-amino-3,6'-dimethylazobenzene. |
| 10 | 37120 | 5-chloro-o-anisidine. |
| 11 | 37085 | 4-chloro-o-toluidine. |
| 12 | 37105 | 5-nitro-o-toluidine. |
| 13 | 37130 | 5-nitro-o-anisidine. |
| 20 | 37175 | 4-amino-2',5'-diethoxybenzanilide. |
| 24 | 37155 | 4'-amino-2',5'-dimethoxybenzanilide. |
| 26 | 37070 | 5-chloro-2-phenoxyaniline. |
| 27 | 37215 | 4-amino-2,5'-dimethylazobenzene. |
| 32 | 37090 | 5-chloro-o-toluidine. |
| 33 | 37075 | 5-chloro-2-(p-chlorophenoxy) aniline. |
| 34 | 37100 | 4-nitro-o-toluidine. |
| 37 | 37035 | p-Nitroaniline. |
| 38 | 37190 | 4-amino-5-methoxy-2-methyl-4'-nitro azobenzene. |
| 42 | 37150 | N',N'-diethyl-4-methoxy metanilamide. |
| 43 | 37160 | 4'-amino-5'-chloro-o-benzanisidide. |
| 46 | 37080 | 3-chloro-o-toluidine. |
| 48 | 37235 | o-Dianisidine. |
| 51 | 37195 | 4-amino-2', 6'-dichloro-2, 5-dimethoxy-4'-nitro azobenzene. |
|  | 37185 | 4,4'-diamino-5-methoxy-2-methylazobenzene. |

It is an essential feature of this invention that the azoic diazo component be present in the application composition with which the stereoregular polypropylene fiber is contacted in the form of the free amine. Stereoregular polypropylene fibers have been found to have a strong absorptive affinity for azoic diazo components in the form of the free amine, but have substantially no absorptive affinity for the salts of such amines with acids, such as, for example, the salts formed with hydrochloric acid or sulfuric acid. For this reason, therefore, the pH of the application composition must be sufficiently high to preclude the presence of or formation of amine salts with acids. This may require pH values in the application composition between about 8 and about 12.

From the hereinabove description, it will be apparent that one mole of azoic coupling component couples with one mole of diazotized amine to produce one mole of azoic dye. In general, therefore, the amount of azoic diazo component employed is between about 1 and about 1.2 molecular proportions, based on one molecular proportion of azoic coupling component employed, and, for optimum results, sufficient to be at least stoichiometrically equivalent to the amount of azoic coupling component absorbed by the fibers. It will be understood by those skilled in the art, of course, that both azoic coupling components and azoic diazo components may not be available from the manufacturer in pure form. On the contrary, the active dyestuff components in compositions offered to the trade are usually diluted somewhat with various dyeing assistants, inerts, and the like. However, this is recognized in the dyeing art, and may be compensated for by the dyer.

As with the azoic coupling component, absorption of the azoic diazo component by stereoregular polypropylene fibers is favored and accelerated by employing elevated temperatures up to the boiling point of the application composition containing the azoic diazo component, preferably between about 180° F. and about 200° F. Although lower temperatures can be employed, the rate of absorption by the fibers is greatly reduced thereby. At elevated temperatures within the preferred range or higher, absorption of the azoic diazo component by the fibers is usually substantially complete within a short time, on the order of about 10 minutes to about 30 minutes. Longer exposures of the fibers to the application composition may be employed as may be desired or necessary in commercial operations.

As with azoic coupling components, practice of this invention contemplates the use in the azoic diazo component application composition of various conventional dye bath assistants and auxiliaries, such as emulsifying agents, wetting agents, carriers, swelling agents, developers, protective colloids, stabilizers, and the like in amounts commonly employed in azoic dyeing of hydrophobic fibers. Surface active agents, preferably nonionic types, such as alkylary polyether alcohols or polyoxylated alkylphenols, are especially desirable in preferred practice of this invention.

Many azoic coupling components will couple with substantially any diazotized azoic diazo component in accordance with this invention to produce an azoic dye which chelates with chelatable polyvalent metal atoms in the fibers to produce dyeings which have greatly superior color fastness to light, and are also color fast to washing and scouring and dry cleaning treatments and are crock resistant. However, in practice it has been found that some combinations of azoic coupling components and azoic diazo components are superior to other combinations, particularly with respect to light fastness, and are, therefore, preferred for optimum results in accordance with this invention. By way of example, it has been found that when employing C.I. azoic coupling component 45, C.I. 37566, Naphthol AS-BI, it is preferred to use the following azoic diazo components:

| Color of Dyeing Obtained | Colour Index Azoic Diazo Component Number | Colour Index Number | Commercial Designation |
| --- | --- | --- | --- |
| Scarlet | 12 | 37105 | Scarlet GC. |
| Do | 46 | 37080 | Scarlet TR. |
| Do | 32 | 37090 | Red KB. |
| Rose, Pink | 10 | 37120 | Red RC. |
| Red, Rubine | 33 | 37075 | Red FR. |
| Bordeaux | 13 | 37130 | Scarlet R. |
| Garnet | 27 | 37215 | Garnet GC. |
| Blue | 20 | 37175 | Blue BB. |

Similarly, when employing C.I. azoic coupling component 14, C.I. 37558, Naphthol AS–PH, it is preferred to use the following azoic diazo components:

| Color of Dyeing Obtained | Colour Index Azoic Diazo Component Number | Colour Index Number | Commercial Designation |
|---|---|---|---|
| Orange | 12 | 37105 | Scarlet G. |
| Do | 3 | 37010 | Scarlet 2G. |
| Do | 13 | 37130 | Scarlet R. |
| Scarlet | 32 | 37090 | Red KBO. |
| Do | 46 | 37080 | Scarlet TR. |
| Rose, Pink | 10 | 37120 | Red RC. |
| Red | 33 | 37075 | Red FR. |
| Violet, Lavender | 11 | 37085 | Red TR. |
| Do | 43 | 37160 | Corinth LB. |
| Garnet | 4 | 37210 | Garnet GBC. |
| Do | 27 | 37215 | Garnet GC. |
| Blue | 24 | 37155 | Blue RR. |

Preferred yellow dyeings include combinations of C.I. Developer 1 (Developer Z) with C.I. azoic diazo component 27, C.I. 37215, Garnet GC, and C.I. azoic coupling component 9, C.I. 37625, Naphthol AS–L4G, with C.I. azoic diazo component 32, C.I. 37090, Red KB; and a preferred blue dyeing (on the purplish side) includes the combination of C.I. azoic coupling component 12, C.I. 37550, Naphthol AS–ITR, with C.I. azoic diazo component 20, C.I. 37175, Blue BB. A preferred red dyeing is obtained with Naphthol AS–ITR and azoic diazo component 42, C.I. 37150, Red ITR. It should be understood, however, that the invention is in no way limited to the specific combinations set forth above by way of example only, since a very large number of satisfactory additional combinations of the various azoic coupling components with the various azoic diazo components can be made within the scope of this invention as described herein.

Following absorption of both the azoic coupling component and the azoic diazo component by the stereoregular polypropylene fibers, the fibers are thoroughly rinsed to wash off any dyestuff components not absorbed by the fibers, and the fibers are subjected to a conventional diazotizing treatment at substantially room temperature for sufficient time to effect diazotization of the azoic diazo component and coupling of the resulting diazotized compoent with the azoic coupling component to develop the azoic dye, usually on the order of about 20 to about 30 minutes. The temperature of the diazotizing (development) bath is then raised to about 110° F.–120° F. and is drained from the fibers. Characteristic

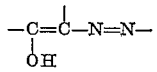

groups in the developed azoic dye may chelate with polyvalent metal atoms of the polyvalent metal compound uniformly distributed within the body of the stereoregular polypropylene fibers to develop the characteristic color fastness to light and to washing and dry cleaning treatments of the dyeings of this invention.

When the diazotizing and coupling is completed, the dyed fibers are rinsed thoroughly, and then are given a conventional hot soaping treatment at temperatures between about 150° F. and the boiling point of the soaping bath and at a pH between about 8 and about 10 to remove any surface deposit of developed dye, and thus improve crocking resistance of the dyeing. This hot alkaline soaping treatment also serves to neutralize or destroy residual nitrous acid, uncoupled diazotized amine, and uncoupled "Naphthol" component, and to bring out the full potential color. This latter effect is often the result of an aggregation or crystallization of the newly formed color within the fiber, promoted by the higher temperature of the soaping treatment. Chelation of the polyvalent metal atoms present in the fibers with characteristic

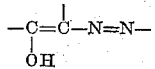

groups in the developed azoic dye may also be promoted in the hot soaping treatment. The fibers are then rinsed well and dried.

From the foregoing description it will be apparent that this invention accomplishes the objectives sought, and provides azoic dyeing of stereoregular polypropylene fibers which have excellent crock resistance, color fastness to light and to customary washing and scouring treatments, and to dry cleaning treatments.

It is further apparent from the foregoing description that many modifications of this invention can be made without departing from the scope thereof, with only such limitations placed thereon as are imposed by the appended claim.

What I claim and desire to protect by Letters Patent is:

The process of dyeing stereoregular polypropylene fibers which comprises (1) immersing stereoregular polypropylene filamentary material having a polyvalent metal compound uniformly distributed therein in an essentially aqueous composition having a pH between about 8 and about 12 and containing an azoic diazo component and an azoic coupling component to effect absorption of said azoic diazo component as the free amine into the fibers, said azoic diazo component and said azoic coupling compent each being devoid of strongly ionizable substituent groups;

(2) thereafter adjusting the pH of said aqueous composition to a value below about 7.5 to effect absorption into the fibers of the azoic coupling component having a free hydroxyl in the coupling position;

(3) immersing the filamentary material containing absorbed azoic diazo component and absorbed azoic coupling component in the presence of each other with a diazotizing composition having a pH below about 5 to effect diazotization of said azoic diazo component and coupling of the resulting diazotized component with said azoic coupling component to develop an azoic dye in the filamentary material whereby the metal atoms of said polyvalent metal compound chelate with the thus developed azoic dye.

References Cited by the Examiner

UNITED STATES PATENTS

| | | | |
|---|---|---|---|
| 2,843,580 | 7/58 | Straley et al. | 260—149 |
| 2,857,372 | 10/58 | Straley et al. | 260—14 |
| 2,865,909 | 12/58 | Straley et al. | 260—14 |
| 2,908,677 | 10/59 | Straley et al. | 260—147 |
| 2,984,634 | 5/61 | Caldwell et al. | 260—234 |
| 2,989,358 | 6/61 | Jurgeleit | 8—46 X |
| 3,069,219 | 12/62 | Olpin et al. | 8—48 |

NORMAN G. TORCHIN, *Primary Examiner.*

ABRAHAM H. WINKELSTEIN, *Examiner.*

UNITED STATES PATENT OFFICE
CERTIFICATE OF CORRECTION

Patent No. 3,164,438  January 5, 1965

Walter W. Thomas

It is hereby certified that error appears in the above numbered patent requiring correction and that the said Letters Patent should read as corrected below.

Column 3, line 3, after "solutions" insert --. Such azoic coupling components form suitable solutions --; column 12, line 44, for "indonaphthols" read -- iodonaphthols --; column 13, line 64, for "-ethoxybenzonthiazole" read ---ethoxybenzothiazol --; column 18, line 38, for "compent" read -- component --.

Signed and sealed this 22nd day of June 1965.

(SEAL)
Attest:

ERNEST W. SWIDER
Attesting Officer

EDWARD J. BRENNER
Commissioner of Patents